United States Patent
Paduraru et al.

(10) Patent No.: US 8,938,321 B2
(45) Date of Patent: Jan. 20, 2015

(54) METHOD AND APPARATUS FOR MULTIPLE CONTROL SCREENS

(75) Inventors: Sergiu Paduraru, Västerås (SE); Lasse Kinnunen, Skultuna (SE); Paul Steiner, Wollerau (SE)

(73) Assignee: ABB Technology Ltd., Zürich (CH)

( * ) Notice: Subject to any disclaimer, the term of this patent is extended or adjusted under 35 U.S.C. 154(b) by 1059 days.

(21) Appl. No.: 12/086,586

(22) PCT Filed: Dec. 15, 2006

(86) PCT No.: PCT/IB2006/004183
§ 371 (c)(1),
(2), (4) Date: Jul. 19, 2010

(87) PCT Pub. No.: WO2007/093850
PCT Pub. Date: Aug. 23, 2007

(65) Prior Publication Data
US 2010/0286834 A1 Nov. 11, 2010

Related U.S. Application Data

(60) Provisional application No. 60/750,384, filed on Dec. 15, 2005.

(51) Int. Cl.
*G05D 3/12* (2006.01)
*H04W 76/02* (2009.01)
(Continued)

(52) U.S. Cl.
CPC ............ *H04W 76/021* (2013.01); *H04W 92/12* (2013.01); *H04Q 2213/13098* (2013.01);
(Continued)

(58) Field of Classification Search
USPC .......................... 700/2, 9, 17, 286, 291, 292
See application file for complete search history.

(56) References Cited

U.S. PATENT DOCUMENTS 5,287,390 A 2/1994 Scarola et al.
7,899,915 B2 * 3/2011 Reisman ....................... 709/228
(Continued)

FOREIGN PATENT DOCUMENTS

CN 1288602 A 3/2001
EP 0 372 924 6/1990
(Continued)

OTHER PUBLICATIONS

Kurth et al. "A Case Study in the Design, Testing and Implementation of a Modern Substation Automation System", Western Power Delivery Automation Conference, Apr. 2004.*
Brand et al. "Design of IEC 61850 Based Substation Automation Systems According to Customer Requirements", ABB Switzerland Ltd, 2004.*

(Continued)

*Primary Examiner* — Carlos Ortiz Rodriguez
(74) *Attorney, Agent, or Firm* — Venable LLP; Eric J. Franklin (57) ABSTRACT

A system for protecting, monitoring, and controlling multiple elements of a high voltage power transmission and distribution system. An intelligent electronic device includes at least one display including a human machine interface configured to display information regarding the multiple elements of the high voltage power transmission and distribution system over a plurality of control screens of the intelligent electronic device and to control the multiple elements of the high voltage power transmission and distribution system.

19 Claims, 7 Drawing Sheets

REAL SWITCHING APPARATUS IN THE SUBSTATION

THE LOGICAL CONTROL OBJECTS THAT CORRESPOND TO THE REAL SWITCHES ARE STORED IN THE IED DATABASES

THE IED MANAGER APPLICATION DOES THE JOB OF MAPPING THE LOGICAL CONTROL OBJECTS TO DIFFERENT DISPLAY CONTAINERS

MULTIPLE DISPLAY CONTAINERS TRANSLATES INTO MULTIPLE CONTROL SCREENS IN THE IED (51) Int. Cl.
*H04W 92/12* (2009.01)
*H04W 8/02* (2009.01)

(52) U.S. Cl.
CPC ............... *H04Q2213/13103* (2013.01); *H04Q 2213/13109* (2013.01); *H04Q 2213/13141* (2013.01); *H04Q 2213/13217* (2013.01); *H04W 8/02* (2013.01)
USPC .................. 700/291; 700/9; 700/17; 700/286

(56) References Cited

U.S. PATENT DOCUMENTS

| | | |
|---|---|---|
| 2002/0054096 A1 | 5/2002 | Thomas |
| 2004/0183522 A1 | 9/2004 | Gunn et al. |
| 2004/0216087 A1 | 10/2004 | Wilson et al. |

FOREIGN PATENT DOCUMENTS

| | | |
|---|---|---|
| WO | WO-0016463 A1 | 3/2000 |
| WO | WO-00/39904 A1 | 7/2000 |

OTHER PUBLICATIONS

Wimmer, Wolfgang, "IEC 61850 SCL—More than interoperable data exchange between engineering tools", 15th PSCC, Liege, Aug. 22-26, 2005.*

Kulkarni et al., "Substation Automation System for 33/66 kV S/S at North Delhi Power Limited", IEEE 2006.*

A. P. Apostolov, "Distributed protection, control and recording in IEC 61850 based substation automation systems", AREVA 2004.*

Office Action issued by the State Intellectual Property Office of the People's Republic of China, Jul. 6, 2011, in connection with counterpart Chinese Patent Application No. 200680047360.0.

V.W. Lohmann et al; Enhanced Customer Value enabled by Synergies Between Protection and Control in High Voltage Substations; IEE, 1996; pp. 98-102.

PCT/ISA/210—International Search Report—Nov. 7, 2007.

PCT/ISA/237—Written Opinion of the International Search Authority—Nov. 7, 2007.

Extended European Search Report, dated Oct. 18, 2012, issued by the European Patent Office in connection with counterpart European Application No. EP 06 84 9521.

* cited by examiner

| ID NO. | APP. NAME | DESCRIPTION | ATTR. GROUP ID |
|---|---|---|---|
| 0 | QA1 | CIRCUIT BREAKER | 3 |
| 1 | QA2 | CIRCUIT BREAKER | 5 |
| 2 | QB1 | ISOLATOR | 2 |
| 3 | QB2 | ISOLATOR | 4 |
| 4 | QB9 | ISOLATOR | 6 |
| 5 | QB61 | ISOLATOR | 8 |
| 6 | QB62 | ISOLATOR | 10 |
| 7 | QC9 | EARTHING SWITCH | 12 |

METHOD AND APPARATUS FOR MULTIPLE CONTROL SCREENS

CROSS-REFERENCE TO RELATED APPLICATIONS

This application claims priority to U.S. provisional patent application 60/750,384 filed 15 Dec. 2005 and is the national phase under 35 U.S.C. §371 of PCT/IB2006/004183 filed 15 Dec. 2006.

FIELD OF THE INVENTION

The invention relates generally to systems for monitoring, control and/or protection of power systems and more particularly, to a method and apparatus including multiple control screens.

BACKGROUND OF THE INVENTION

In a power transmission or power distribution system, power generated by a power generation company may be transmitted or distributed at different voltage levels to various consumers, ranging from power distribution companies to industrial consumers. At least some known power systems include switchgear, which facilitates dividing the power into branch circuits, which supply power to various consumers. One goal of a power system monitoring and control architecture is to control the switchgear and other power equipment. The number of switchgear elements that can be controlled is limited mainly by the number of objects that can be handled on one display.

SUMMARY OF THE INVENTION

The present invention overcomes limitations in of known methods and devices by mapping the logical controllable objects in the intelligent devices' databases on multiple screens.

Embodiments of the present invention provide a system for protecting, monitoring, and controlling multiple elements of a high voltage power transmission and distribution system. The system includes an intelligent electronic device and at least one display including a human machine interface configured to display information regarding the multiple elements of the high voltage power transmission and distribution system and control the multiple elements of the high voltage power transmission and distribution system.

Aspects of the present invention also include a human machine interface including representations of a plurality of elements of a high voltage power transmission and distribution system, information regarding the plurality of elements, and active control elements configured to receive user input to control the plurality of elements.

Additional embodiments of the present invention provide a computer program product including a computer readable medium and computer program instructions recorded on the computer readable medium and executable by a processor for carry out a method including connecting an intelligent electronic device to the high voltage power transmission and distribution system, the intelligent electronic device comprising a display, at least one of protection and control functions and being configured to control the multiple elements of the high voltage power transmission and distribution system; mapping the multiple elements of the high voltage power transmission and distribution system over a plurality of control screens of the intelligent electronic device; and operating the multiple elements of a high voltage power transmission and distribution system through a graphical-set single line diagram.

Other aspects of the present invention include a system for performing a process for protecting, monitoring, and controlling multiple elements of a high voltage power transmission and distribution system. The system includes a processor operable to execute computer program instructions and a memory operable to store computer program instructions executable by the processor, for performing the steps of connecting an intelligent electronic device to the high voltage power transmission and distribution system, the intelligent electronic device comprising a display, at least one of protection and control functions and being configured to control the multiple elements of the high voltage power transmission and distribution system; mapping the multiple elements of the high voltage power transmission and distribution system over a plurality of control screens of the intelligent electronic device; and operating the multiple elements of a high voltage power transmission and distribution system through a graphical-set single line diagram.

Still further aspects of the present invention provide a method for protecting, monitoring, and controlling multiple elements of a high voltage power transmission and distribution system. The method includes connecting an intelligent electronic device to the high voltage power transmission and distribution system, the intelligent electronic device comprising a display, at least one of protection and control functions and being configured to control the multiple elements of the high voltage power transmission and distribution system. The multiple elements of the high voltage power transmission and distribution system are mapped over a plurality of control screens of the intelligent electronic device. The multiple elements of a high voltage power transmission and distribution system are operated through a graphical-set single line diagram.

Further objectives and advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical; functionally similar, and/or structurally similar elements.

DETAILED DESCRIPTION OF EMBODIMENTS OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Power transmission and distribution systems include equipment such as circuit breakers, relays, meters, disconnectors, switches, tap changers and other equipment utilized in power transmission, sub-transmission and/or distribution. The present invention may display information regarding a plurality of "bays". "Bay" is a generic term used with respect to a group of primary equipment in a substation. For example, there are circuit-breaker bays and disconnector bays. A plurality of bays are included in a substation. Monitoring and control of such equipment is vital to avoid and/or minimize events and disturbances that can disrupt deliver of power to homes and business and the associated cost and social disruption.

Power transmission and distribution in high voltage applications is typically controlled with intelligent electronic devices (IEDs). This is in contrast to low voltage applications, which are typically controlled utilizing commercially available personal computers. IEDs are suitable for environments in which high voltage applications may exist, such as high electromagnetic fields and large temperature variations. IEDs fulfil the main tasks of protection, monitoring and control of power systems and/or devices, which they mostly perform in real time.

IEDs typically do not protect, monitor and/or control more than one object. An "object" can include any of the power equipment noted above, or any other power transmission and distribution equipment. The present invention includes an IED that can control multiple elements of an electrical transmission and distribution system, such as multiple bays.

Because IEDs currently utilized in high voltage applications do not protect, monitor and/or control more than one object user interfaces included in the IEDs do not user interfaces included in typical IEDs typically include only one screen to carry out the protection, monitoring and/or control functions. Even if IEDs currently utilized in high voltage applications would have allowed them to protect, monitor and/or control multiple bays, IEDs could not carry out could not carry out these functions because the user interfaces lacked the ability to display information regarding multiple elements. Additionally, unlike high voltage applications, low voltage systems do not include bays. Furthermore, interfaces for low voltage applications typically control only very limited activities.

The present invention includes a system for carrying out at least one function that may include protecting, monitoring and controlling multiple elements of a high voltage transmission and distribution system. The system includes an IED that can protect, monitor and control the multiple elements. For example, an IED included in the system may control multiple bays. According to one example, the system according to the present invention may include an IED that can control, among other elements, a 1½ breaker diameter.

While the system may include more than one IED, each LED can protect, monitor and control multiple elements. This is because each IED includes a human machine interface that can display information and permit user input to control the multiple elements. The interface may include a display that can display information concerning the multiple elements simultaneously. Alternatively, the interface may sequentially display screens that include information and can permit control of the multiple elements. The display could present information and control elements regarding the elements simultaneously. According to some embodiments, information about one or more elements being controlled only is displayed at one time. Control elements for one or more elements only may be displayed. The interface can include elements for changing the information displayed. These elements may be provided on a display or on surrounding hardware, or a combination of both.

The display may include various elements for controlling the multiple elements and the interface. The control elements can include active buttons on the interface. Therefore, the interface may include a touch-screen interface. The interface could also include hardware input elements with changing contexts that are displayed on a display. Examples of the type of control operations that may be performed with a human-machine interface according to the present invention include:

opening/closing graphical representation of the controlled apparatuses;

voltage control;

logical switch operation; and/or simple switches indication and visualisation.

Each screen may include individual representation and control modus.

Figure 1:
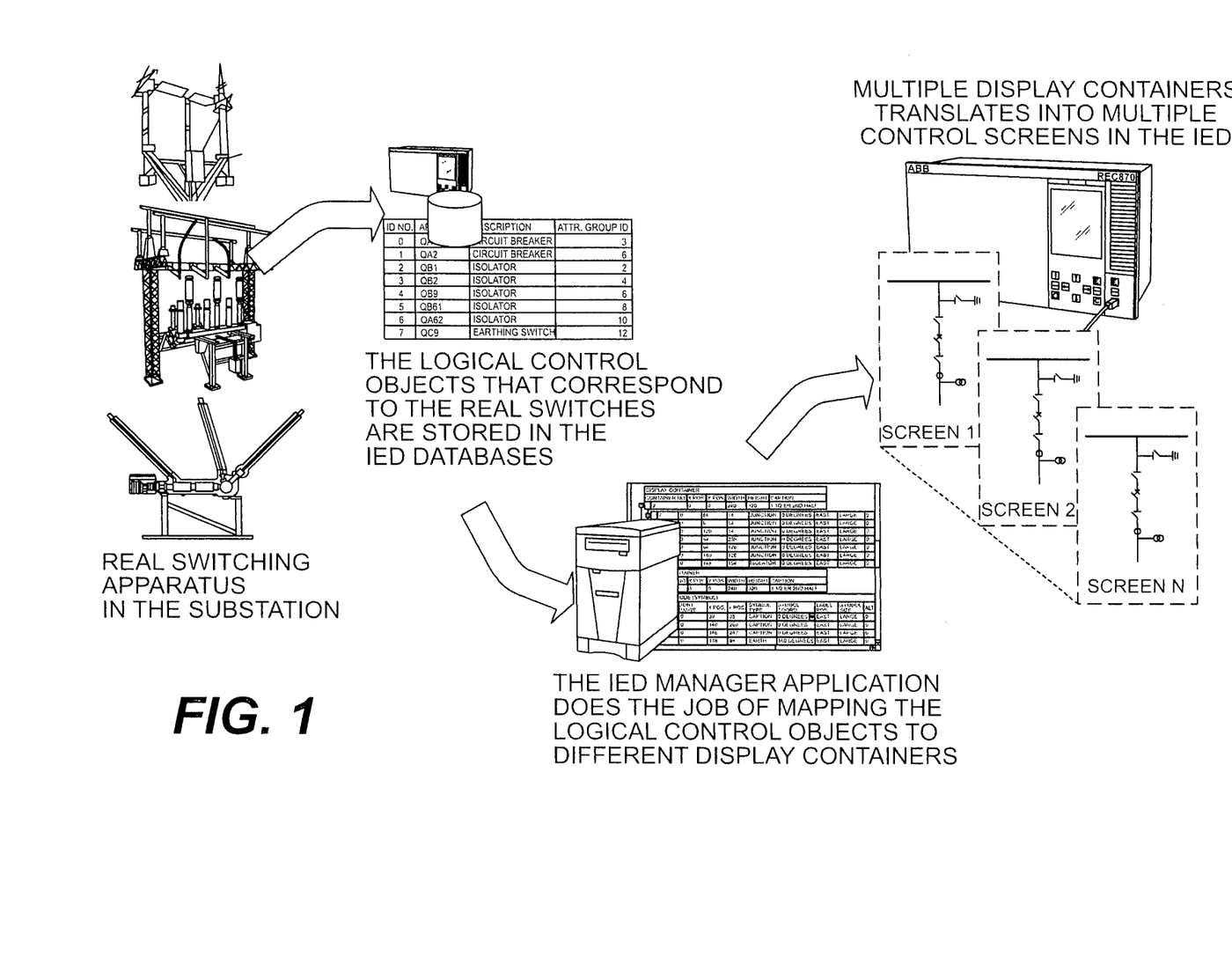
FIG. 1 represents a schematic drawing illustrating aspects of an embodiment of the present invention and an example of power system equipment.

FIG. 1 illustrates an embodiment of the present invention, showing a process flow. FIG. 1 illustrates elements of a real switching apparatus in a substation. Logical control objects are created to correspond to the elements of the switching apparatus. The logical control objects are mapped to the elements of the substation. Mapping is a process of extracting from databases properties of an object or apparatus and of associating the properties with a graphical object or symbol in a single-line-diagram (SLD). The SLD may be constructed in a graphical manner using symbols. Such an SLD is known as a "graphical-set SLD".

Figure 2:
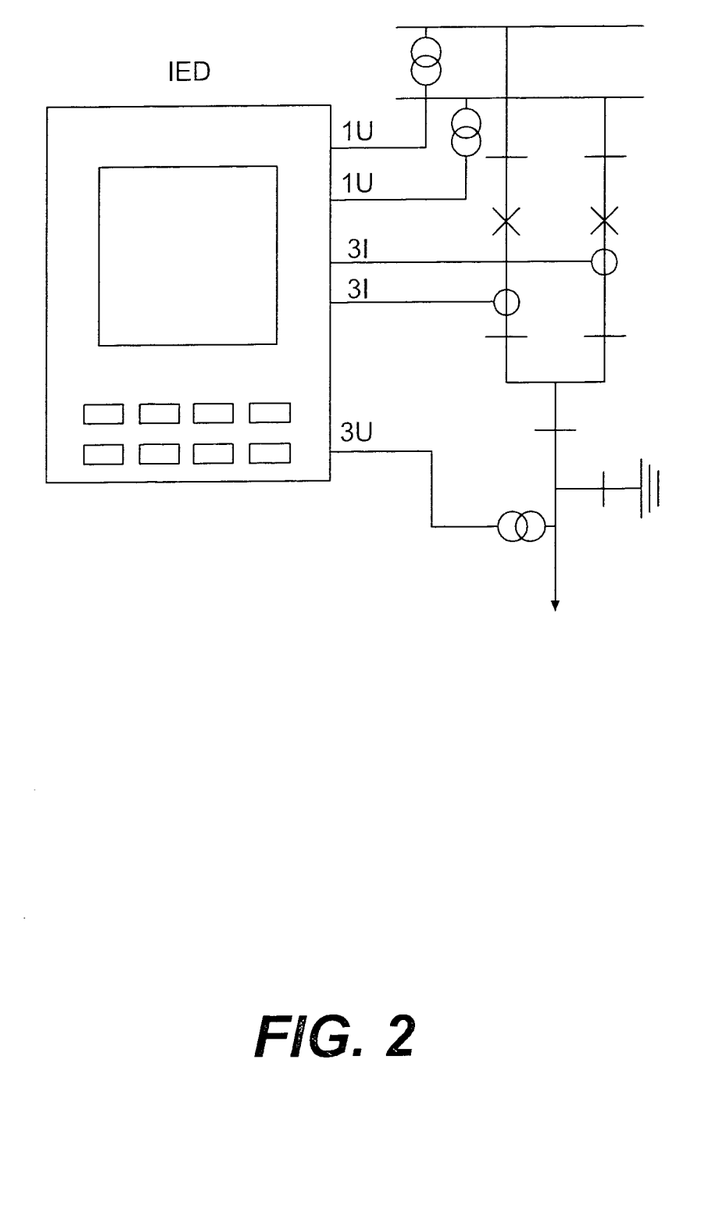
FIG. 2 represents a schematic drawing illustrating an embodiment of the present invention connected to multiple power system primary objects.
Figure 3:
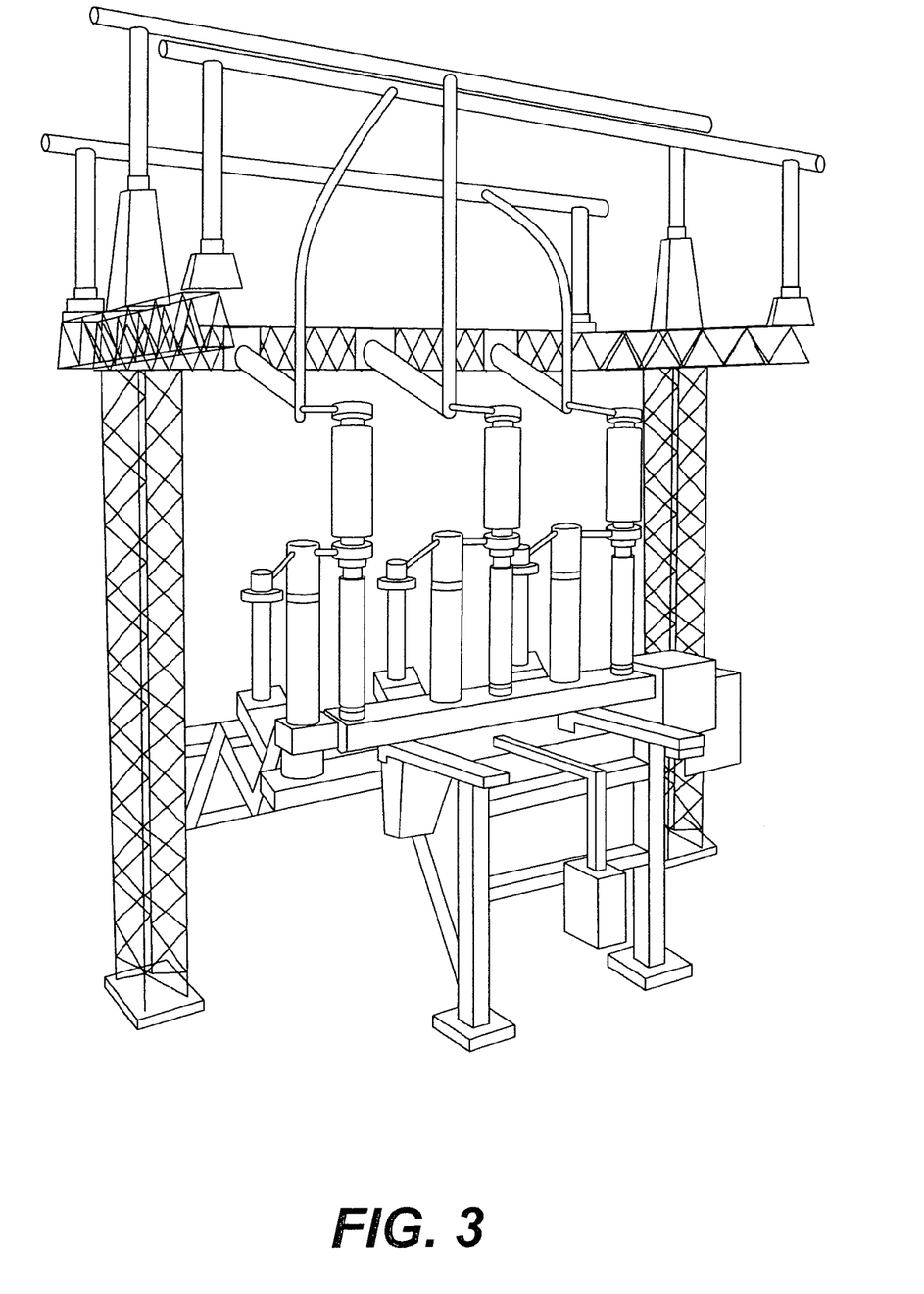
FIG. 3 represents a close-up view of an embodiment of power system primary objects to which an embodiment of the present invention may be connected.
Figure 4:
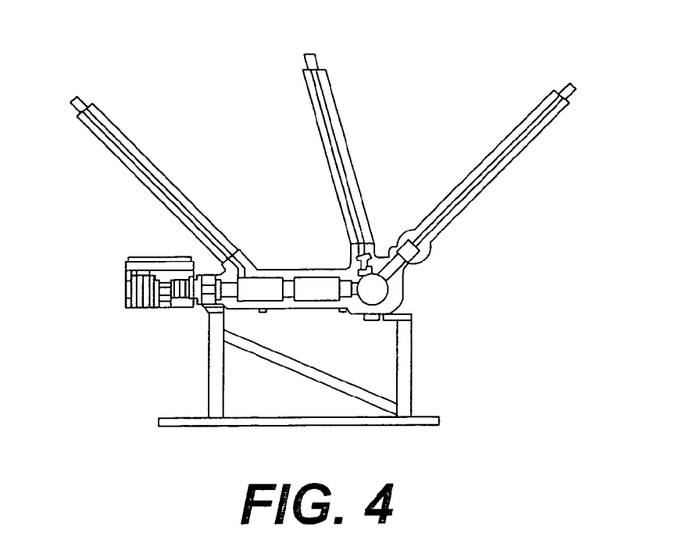
FIG. 4 represents a close-up view of another embodiment of power system primary objects to which an embodiment of the present invention may be connected.
Figure 5:
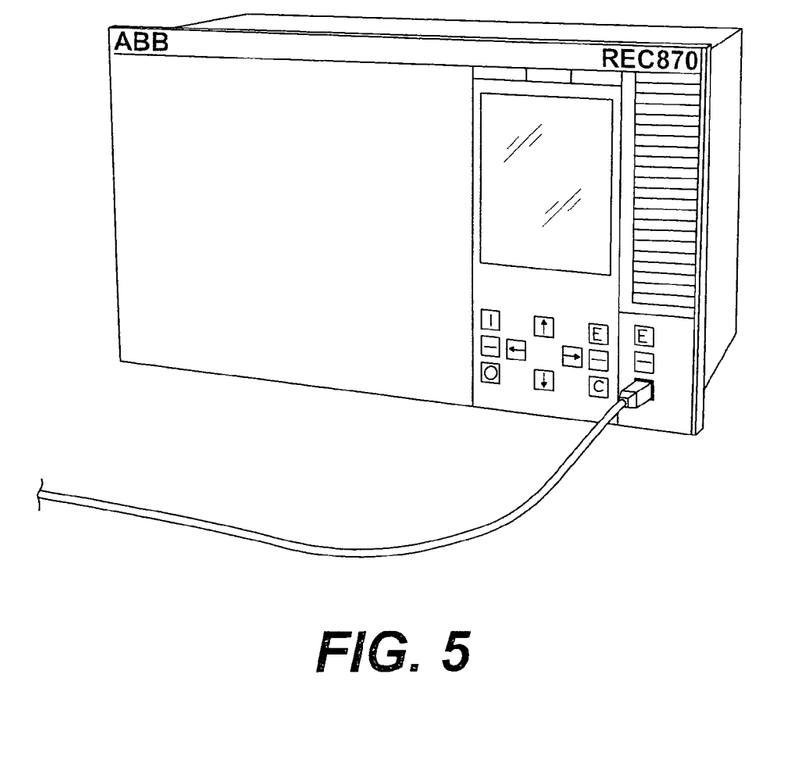
FIG. 5 represents an embodiment of the present invention.

FIG. 2 illustrates an IED including an embodiment of a display according to the present invention connected to a double circuit breaker. FIGS. 3 and 4 illustrate other examples of power transmission and distribution equipment that the present invention may be utilized in monitoring, protecting and/or controlling.

Figure 6:
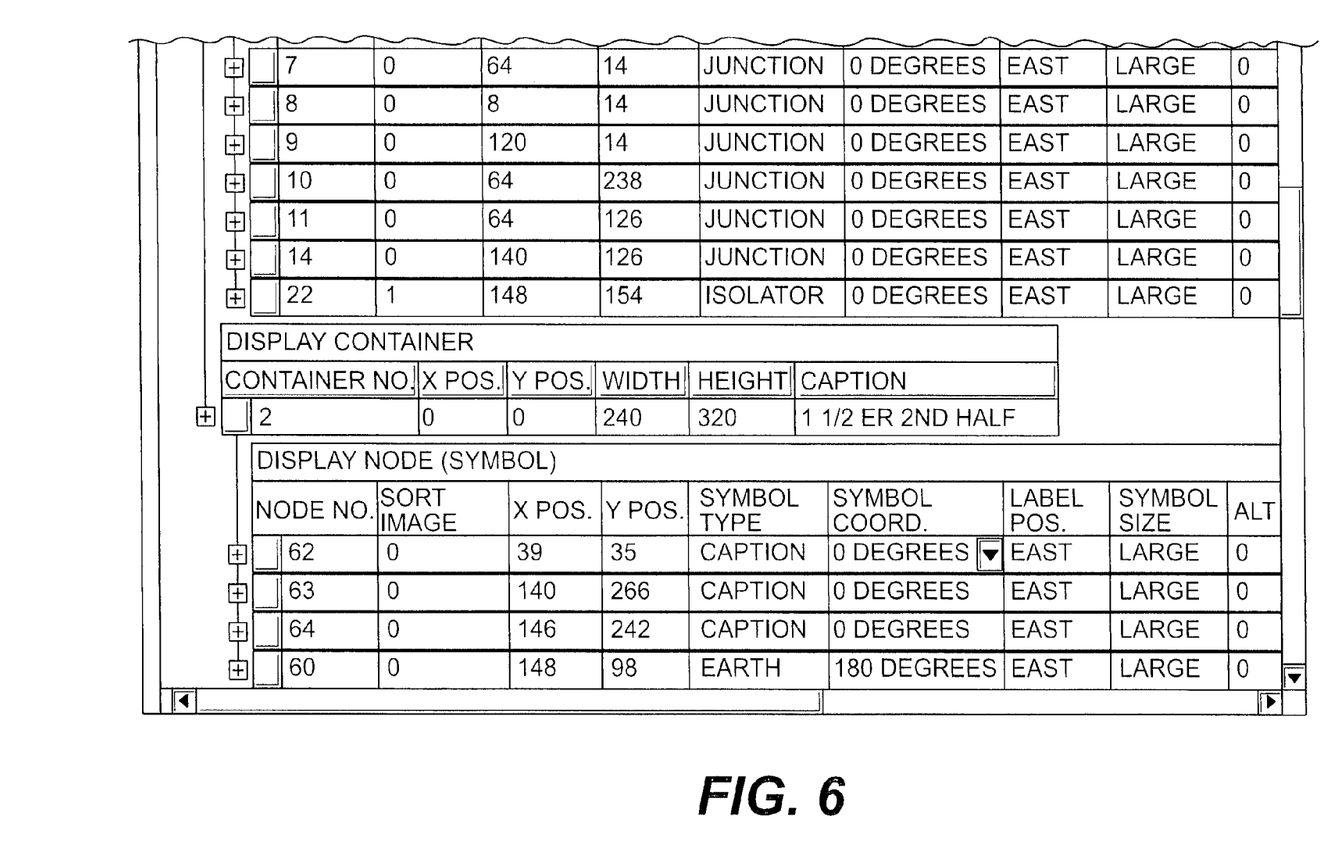
FIG. 6 represents an embodiment of a screen shot that may be included in a system according to the present invention.
Figure 8:
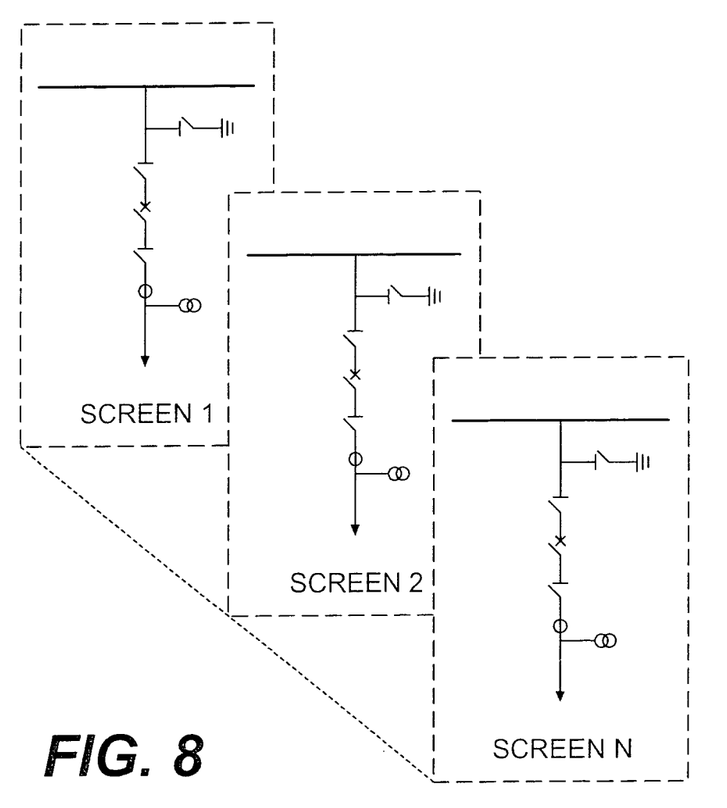
FIG. 8 represents a portion of the contents of three display screens according to an embodiment of the present invention.

FIG. 6 represents a screen shot from an embodiment of the present invention displaying information regarding multiple objects. FIG. 8 illustrates embodiments of three screens that may be included in an embodiment according to the present invention. According to this embodiment, the screens may be displayed as desired by a user. For example, a user may toggle among the screens.

Figure 7:
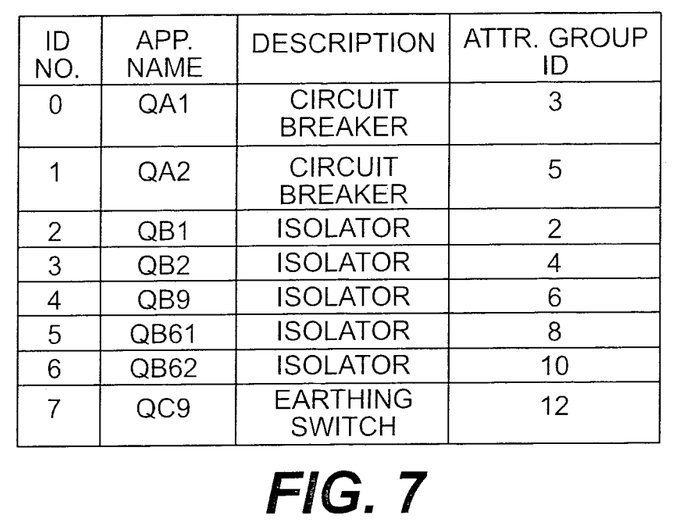
FIG. 7 represents a table illustrating logical control of objects that correspond to real switches stored in databases of intelligent electronic devices.

Mapping may be controlled in a logical objects control mapping (LOCM) module included in an IED manager application. The LOCM can connect together logical control nodes, the configuration in which these are present, and the different display containers (the logical image of the multiple screens) so that in the end, the user has the opportunity to control apparatuses over multiple control screens. FIG. 7 illustrates logical control objects that correspond to real switches stored in IED databases.

The interface according to the present invention may include a configuration tool for configuring each real world element of a substation or other portion of a transmission and distribution system. Each element may be represented in the configuration tool with corresponding a "logical object image". Each logical object input has associated inputs, outputs, settings and reports. The element can be controlled through the logical object inputs, outputs, settings and reports. The interface may also include a graphical representation of each element in the SLD associated through a handle.

The present invention also includes a computer program product. The computer program product includes a computer readable medium. Computer program instructions executable by a processor are recorded on the computer readable medium. The computer program instructions are for carrying out any of the functions described above. For example, the computer program instructions can include mapping the multiple elements of the high voltage power transmission and distribution system over a plurality of control screens of the intelligent electronic device, and operating the multiple elements of a high voltage power transmission and distribution system through a graphical-set single line diagram.

The present invention also includes a system for performing a process for protecting, monitoring, and controlling multiple elements of a high voltage power transmission and distribution system. The system includes a processor operable to execute computer program instructions and a memory operable to store computer program instructions executable by the processor. The computer program instructions are for carrying out any function described herein. According to one embodiment, the computer program instructions are for performing the steps of connecting an intelligent electronic device to the high voltage power transmission and distribution system, the intelligent electronic device comprising a display, at least one of protection and control functions and being configured to control the multiple elements of the high voltage power transmission and distribution system, mapping the multiple elements of the high voltage power transmission and distribution system over a plurality of control screens of the intelligent electronic device, and operating the multiple elements of a high voltage power transmission and distribution system through a graphical-set single line diagram.

Figure 9:
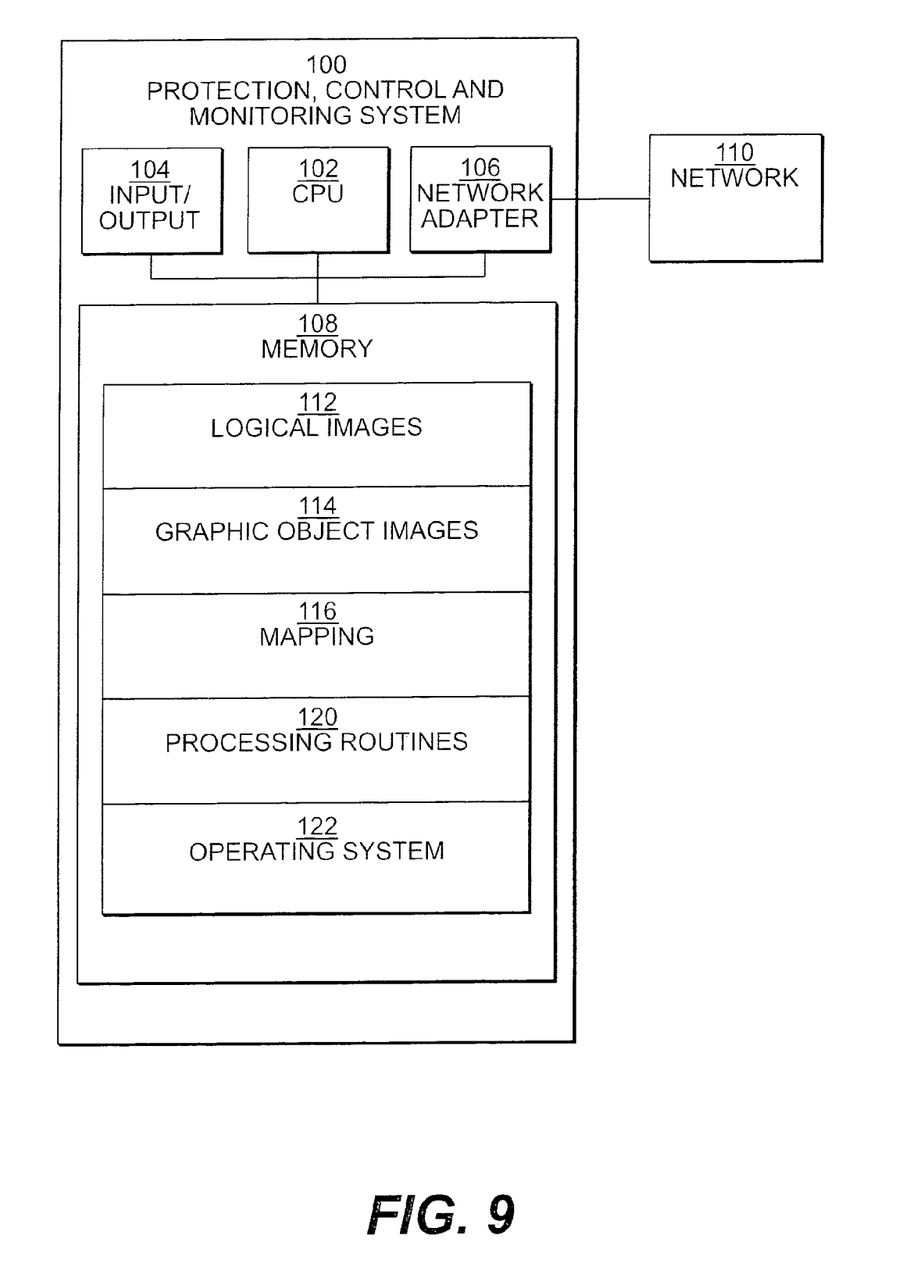
FIG. 9 represents a block diagram of a system according to the present invention.

FIG. 9 illustrates an exemplary block diagram of a system 100 for performing a process for protecting, monitoring, and controlling multiple elements of a high voltage power transmission and distribution system according to the present invention. Protecting, monitoring, and controlling system 100 is typically a programmed IED. Protecting, monitoring, and controlling system 100 includes processor (CPU) 102, input/output circuitry 104, network adapter 106, and memory 108. CPU 102 executes program instructions in order to carry out the functions of the present invention. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces protecting, monitoring, and controlling system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as logical image block 112, graphical object image block 114, mapping block 116, and a plurality of blocks of program instructions, such as processing routines 120 and operating system 122. Logical image block 112 stores a plurality of logical images of elements of a high voltage power transmission and distribution system protected, monitored and controlled by system 100. Graphical object image block 114 stores a plurality of graphical object images. Mapping block 116 stores associations between element/apparatus and graphical object images. Processing routines 120 are software routines that implement the processing performed by the present invention. Operating system 122 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A system for protecting, monitoring, and controlling multiple elements of a high voltage power transmission and distribution system, the system comprising:

an intelligent electronic device configured to protect, monitor and control multiple elements of the high voltage power transmission and distribution system, wherein the multiple elements are arranged in multiple bays, the intelligent electronic device comprising at least one display comprising a human machine interface simultaneously or sequentially displaying information and control elements regarding the multiple elements of the high voltage power transmission and distribution system over a plurality of control screens of the intelligent electronic device, wherein the human machine interface is configured to control the multiple elements of the high voltage power transmission and distribution system, and wherein the intelligent electronic device is configured to map each of the multiple elements of the high voltage power transmission and distribution system to one of a plurality of control screens.

2. The system according to claim 1, wherein the system comprises multiple displays each comprising a human machine interface.

3. The system according to claim 2, wherein each display displays information regarding at least one element of the high voltage power transmission and distribution system.

4. The system according to claim 1, wherein the human machine interface is configured to carry out at least one function from the group comprising:
  opening and closing of graphical representations of the elements of the high voltage power transmission and distribution system;
  controlling voltage;
  logical switch operation; and
  indication and visualization of switches.

5. The system according to claim 1, wherein the elements of the high voltage power transmission and distribution system comprise elements for power transmission, sub-transmission and/or distribution substations.

6. The system according to claim 1, wherein the intelligent electronic device is configured to display information regarding and control multiple bays of the high voltage power transmission and distribution system.

7. The system according to claim 1, wherein the intelligent electronic device is configured to display information regarding and control a 1½ breaker diameter.

8. The system according to claim 1, wherein the intelligent electronic device comprises a logical objects control mapping algorithm configured to map the multiple elements of the high voltage power transmission and distribution system represented by logical object images over a plurality of display pages.

9. The system according to claim 8, wherein the intelligent electronic device further includes a configuration and setting tool comprising the algorithm.

10. The system according to claim 9, wherein a result of processing according to the algorithm is loaded in the intelligent electronic device.

11. The system according to claim 1, wherein the multiple elements of a high voltage power transmission and distribution system comprise circuit breakers, isolators and earthing switches.

12. The system according to claim 1, wherein the display is configured to permit a user to operate the multiple elements from a graphical-set single line diagram.

13. The system according to claim 1, wherein the elements of the high voltage power transmission and distribution system that the intelligent electronic device is configured to protect, monitor and control are selected form circuit breakers, relays, meters, disconnectors, switches, tap changers or other equipment utilized in power transmission, sub-transmission and/or distribution of high voltage power.

14. A human machine interface in a display of an intelligent electronic device, the human machine interface comprising:
  representations of a plurality of elements of a high voltage power transmission and distribution system provided over a plurality of control screens of the intelligent electronic device, wherein the plurality of elements are arranged in multiple bays;
  information regarding the plurality of elements;
  an algorithm configured to map each of the multiple elements of the high voltage power transmission and distribution system to one of the plurality of control screens;
  active control elements configured to receive user input to control the plurality of elements, wherein the human machine interface is configured to simultaneously or sequentially display the information and control elements.

15. A computer program product, comprising:
a non-transitory computer readable medium; and
computer program instructions recorded on the computer readable medium and executable by a processor for carrying out a method comprising
  connecting an intelligent electronic device to multiple elements of a high voltage power transmission and distribution system, wherein the multiple elements are arranged in multiple bays, the intelligent electronic device comprising a display, at least one of protection and control functions and being configured to protect, monitor and control the multiple elements of the high voltage power transmission and distribution system,
  simultaneously or sequentially displaying on the display of the intelligent electronic device a human machine interface information and control elements regarding the multiple elements of the high voltage power transmission and distribution system over a plurality of control screens, wherein the human machine interface is configured to control the multiple elements of the high voltage power transmission and distribution system,
  mapping each of the multiple elements of the high voltage power transmission and distribution system to one of the plurality of control screens of the intelligent electronic device, and
  operating the multiple elements of a high voltage power transmission and distribution system utilizing the human machine interface.

16. A system for performing a process for protecting, monitoring, and controlling multiple elements of a high voltage power transmission and distribution system, the system comprising:
  a processor operable to execute computer program instructions; and
  a memory operative to store computer program instructions executable by the processor, for performing a method comprising connecting an intelligent electronic device to multiple elements of a high voltage power transmission and distribution system, wherein the multiple elements are arranged in multiple bays, the intelligent electronic device comprising a display, at least one of protection and control functions and being configured to protect, monitor and control the multiple elements of the high voltage power transmission and distribution system, simultaneously or sequentially displaying on the display of the intelligent electronic device a human machine interface information and control elements regarding the multiple elements of the high voltage power transmission and distribution system over a plurality of control screens, wherein the human machine interface is configured to control the multiple elements of the high voltage power transmission and distribution system, mapping each of the multiple elements of the high voltage power transmission and distribution system to one of the plurality of control screens of the intelligent electronic device, and operating the multiple elements of a high voltage power transmission and distribution system utilizing the human machine interface.

17. A method for protecting, monitoring, and controlling multiple elements of a high voltage power transmission and distribution system, the method comprising:

connecting an intelligent electronic device to multiple elements of a high voltage power transmission and distribution system, wherein the multiple elements are arranged in multiple bays, the intelligent electronic device comprising a display, at least one of protection and control functions and being configured to protect, monitor and control the multiple elements of the high voltage power transmission and distribution system, simultaneously or sequentially displaying on the display of the intelligent electronic device a human machine interface information and control elements regarding the multiple elements of the high voltage power transmission and distribution system over a plurality of control screens, wherein the human machine interface is configured to control the multiple elements of the high voltage power transmission and distribution system, mapping each of the multiple elements of the high voltage power transmission and distribution system to one of the control screens of the intelligent electronic device, and operating the multiple elements of a high voltage power transmission and distribution system utilizing the human machine interface.

18. The method according to claim 17, further comprising:

representing the multiple elements of the high voltage power transmission and distribution system with logical object images over a plurality of display pages;

carrying out the mapping with a logical objects control mapping algorithm configured to permit the mapping of the multiple elements of the high voltage power transmission and distribution system; and loading results of processing with the algorithm in the intelligent electronic device.

19. The method according to claim 18, further comprising:

storing the algorithm in a configuration and setting tool of the intelligent electronic device.

* * * * *